United States Patent
Rochelle et al.

(10) Patent No.: US 11,941,352 B2
(45) Date of Patent: *Mar. 26, 2024

(54) COLLABORATIVE ONLINE SPREADSHEET APPLICATION

(71) Applicant: Google LLC, Mountain View, CA (US)

(72) Inventors: Jonathan Rochelle, Chester, NJ (US); Micah Lemonik, Great Neck, NY (US); Farzad Khosrowshahi, Pleasantville, MA (US); John Stephen Danaher, Winchester, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,861

(22) Filed: Aug. 10, 2020

(65) Prior Publication Data

US 2021/0027014 A1    Jan. 28, 2021

Related U.S. Application Data

(63) Continuation of application No. 15/838,535, filed on Dec. 12, 2017, now Pat. No. 10,740,551, which is a
(Continued)

(51) Int. Cl.
*G06F 15/16* (2006.01)
*G06F 8/34* (2018.01)
(Continued)

(52) U.S. Cl.
CPC ............ *G06F 40/18* (2020.01); *G06F 8/34* (2013.01); *G06F 16/93* (2019.01); *G06F 40/103* (2020.01);
(Continued)

(58) Field of Classification Search
CPC ........ G06F 17/246; G06Q 10/10; H04L 67/42
See application file for complete search history.

(56) References Cited

U.S. PATENT DOCUMENTS

| 5,220,657 A | 6/1993 | Bly et al. |
| 5,337,407 A | 8/1994 | Bates et al. |

(Continued)

FOREIGN PATENT DOCUMENTS

| EP | 1132847 | 1/2013 |
| JP | 2004110714 | 1/2003 |

(Continued)

OTHER PUBLICATIONS

Arrrington, Michael, Writely—Process Words with your Browser, Aug. 31, 2005. Retrieved from the internet: URL rittps://techcrunch.com/2005/08/31/writely-process-words-with-your-browser/ [retrieved on Jan. 21, 2020].

(Continued)

*Primary Examiner* — Hieu T Hoang
(74) *Attorney, Agent, or Firm* — Lowenstein Sandler LLP

(57) ABSTRACT

A method of simultaneous multiuser collaborative access to a spreadsheet includes transmitting the spreadsheet to a first device of a first user having a first privilege for a first part that includes a first cell, transmitting the spreadsheet to a second device of a second user having a second privilege for a second part, receiving a first edit of the first cell from the first device, and a second edit of the second cell from the second device, and in response to the first cell and the second cell being different, the first privilege including an edit privilege, and the second privilege including the edit privilege, accepting the first edit, accepting the second edit, forwarding the first edit for display with the first cell at the second device, and providing, to the second device, a real-time visual indication identifying the first user as a last user editing the first part.

18 Claims, 8 Drawing Sheets

Related U.S. Application Data continuation of application No. 13/897,964, filed on May 20, 2013, now Pat. No. 9,852,120, which is a continuation of application No. 13/615,797, filed on Sep. 14, 2012, now Pat. No. 8,447,886, which is a continuation of application No. 11/278,345, filed on Mar. 31, 2006, now Pat. No. 8,307,119.

(51) Int. Cl.
*G06F 16/93* (2019.01)
*G06F 40/103* (2020.01)
*G06F 40/174* (2020.01)
*G06F 40/18* (2020.01)
*G06Q 10/10* (2023.01)
*H04L 67/01* (2022.01)
*G06F 16/958* (2019.01)
*G06F 40/106* (2020.01)
*G06F 40/177* (2020.01)

(52) U.S. Cl.
CPC ........... *G06F 40/174* (2020.01); *G06Q 10/10* (2013.01); *H04L 67/01* (2022.05); *G06F 16/958* (2019.01); *G06F 40/106* (2020.01); *G06F 40/177* (2020.01)

(56) References Cited

U.S. PATENT DOCUMENTS

| | | | |
|---|---|---|---|
| 5,339,388 A * | 8/1994 | Bates | G06F 3/04812 715/742 |
| 5,546,580 A | 8/1996 | Seliger | |
| 5,548,304 A | 8/1996 | Yoshino et al. | |
| 5,630,126 A | 5/1997 | Redpath | |
| 5,890,177 A | 3/1999 | Moody | |
| 6,006,239 A | 12/1999 | Bhansali et al. | |
| 6,023,715 A | 2/2000 | Burkes et al. | |
| 6,067,551 A | 5/2000 | Brown et al. | |
| 6,157,934 A | 12/2000 | Khan et al. | |
| 6,161,099 A | 12/2000 | Harrington et al. | |
| 6,201,859 B1 | 3/2001 | Memhard et al. | |
| 6,233,600 B1 | 5/2001 | Salas et al. | |
| 6,240,414 B1 | 5/2001 | Beizer et al. | |
| 6,314,409 B2 | 11/2001 | Schneck et al. | |
| 6,507,845 B1 | 1/2003 | Cohen et al. | |
| 6,519,700 B1 | 2/2003 | Ram et al. | |
| 6,611,498 B1 | 8/2003 | Baker et al. | |
| 6,613,098 B1 | 9/2003 | Sorge et al. | |
| 6,631,497 B1 | 10/2003 | Jamshidi et al. | |
| 6,691,281 B1 | 2/2004 | Sorge et al. | |
| 6,701,485 B1 | 3/2004 | Igra et al. | |
| 6,754,677 B1 | 6/2004 | Cho et al. | |
| 6,763,464 B2 | 7/2004 | Wang et al. | |
| 6,779,151 B2 | 8/2004 | Cahill et al. | |
| 6,857,102 B1 | 2/2005 | Bickmore et al. | |
| 6,898,760 B2 | 5/2005 | Bedford et al. | |
| 6,948,134 B2 | 9/2005 | Gauthier et al. | |
| 6,973,619 B1 | 12/2005 | Hirose et al. | |
| 6,988,241 B1 | 1/2006 | Guttman et al. | |
| 7,082,569 B2 | 7/2006 | Voshell | |
| 7,162,528 B1 | 1/2007 | Simonoff et al. | |
| 7,225,189 B1 | 5/2007 | McCormack et al. | |
| 7,233,951 B1 | 6/2007 | Gainer et al. | |
| 7,275,209 B1 | 9/2007 | Jones et al. | |
| 7,296,219 B1 | 11/2007 | Guttman et al. | |
| 7,383,272 B2 | 6/2008 | Krishnan et al. | |
| 7,389,473 B1 | 6/2008 | Sawicki et al. | |
| 7,454,471 B2 | 11/2008 | Sorge et al. | |
| 7,523,394 B2 | 4/2009 | Jones et al. | |
| 7,523,395 B1 | 4/2009 | Namait et al. | |
| 7,577,906 B2 * | 8/2009 | Friedrichowitz | G06F 40/174 707/999.008 |
| 7,584,268 B2 | 9/2009 | Kraus et al. | |
| 7,584,419 B1 | 9/2009 | Jones et al. | |
| 7,640,506 B2 | 12/2009 | Pratley et al. | |
| 7,657,571 B2 | 2/2010 | Battagin et al. | |
| 7,904,323 B2 | 3/2011 | Wynn et al. | |
| 8,307,119 B2 | 11/2012 | Rochelle et al. | |
| 8,578,399 B2 | 11/2013 | Khen et al. | |
| 9,002,935 B1 | 4/2015 | Ho | |
| 9,009,582 B2 | 4/2015 | Rochelle et al. | |
| 9,026,903 B1 | 5/2015 | Michael et al. | |
| 9,501,463 B1 | 11/2016 | Anderson | |
| 2001/0021926 A1 | 9/2001 | Schneck et al. | |
| 2002/0026478 A1 | 2/2002 | Rodgers et al. | |
| 2002/0065848 A1 * | 5/2002 | Walker | G06F 21/6209 715/255 |
| 2002/0073163 A1 * | 6/2002 | Churchill | G06Q 10/10 709/214 |
| 2002/0078074 A1 | 6/2002 | Cho et al. | |
| 2002/0082857 A1 | 6/2002 | Skordin et al. | |
| 2002/0091730 A1 | 7/2002 | Bedford et al. | |
| 2002/0091871 A1 | 7/2002 | Cahill et al. | |
| 2002/0129106 A1 | 9/2002 | Gutfreund | |
| 2002/0169799 A1 | 11/2002 | Voshell | |
| 2002/0188629 A1 | 12/2002 | Burfoot | |
| 2002/0194095 A1 | 12/2002 | Koren | |
| 2002/0194485 A1 | 12/2002 | Ram et al. | |
| 2003/0014513 A1 | 1/2003 | Ruths et al. | |
| 2003/0028562 A1 | 2/2003 | Shaughnessy et al. | |
| 2003/0055847 A1 | 3/2003 | Cho et al. | |
| 2003/0088831 A1 | 5/2003 | Bauer et al. | |
| 2003/0105816 A1 | 6/2003 | Goswami | |
| 2003/0105845 A1 | 6/2003 | Leermakers | |
| 2003/0110191 A1 | 6/2003 | Handsaker et al. | |
| 2003/0179230 A1 | 9/2003 | Seidman | |
| 2003/0182621 A1 | 9/2003 | Mazza et al. | |
| 2003/0226105 A1 | 12/2003 | Waldau | |
| 2004/0034642 A1 * | 2/2004 | Szilagyi | G06F 9/524 |
| 2004/0088646 A1 | 5/2004 | Yeager et al. | |
| 2004/0107224 A1 | 6/2004 | Bera | |
| 2004/0131999 A1 | 7/2004 | Dresnick | |
| 2004/0177321 A1 | 9/2004 | Brown et al. | |
| 2004/0181748 A1 | 9/2004 | Jamshidi et al. | |
| 2004/0210818 A1 | 10/2004 | Jones et al. | |
| 2004/0214560 A1 | 10/2004 | Date et al. | |
| 2004/0220977 A1 | 11/2004 | Cho et al. | |
| 2004/0237045 A1 | 11/2004 | Meltzer | |
| 2004/0267871 A1 | 12/2004 | Pratley et al. | |
| 2005/0055337 A1 | 3/2005 | Bebo et al. | |
| 2005/0060342 A1 | 3/2005 | Farag | |
| 2005/0097115 A1 | 5/2005 | Bedford | |
| 2005/0108623 A1 | 5/2005 | Bedford | |
| 2005/0246635 A1 | 11/2005 | Hirose et al. | |
| 2005/0268215 A1 | 12/2005 | Battagin et al. | |
| 2006/0004832 A1 | 1/2006 | Langsford et al. | |
| 2006/0015805 A1 | 1/2006 | Humenansky et al. | |
| 2006/0020673 A1 | 1/2006 | Sorge et al. | |
| 2006/0026502 A1 | 2/2006 | Dutta | |
| 2006/0053380 A1 | 3/2006 | Spataro et al. | |
| 2006/0080432 A1 | 4/2006 | Spataro et al. | |
| 2006/0080596 A1 | 4/2006 | Bhogal et al. | |
| 2006/0112123 A1 | 5/2006 | Clark et al. | |
| 2006/0179411 A1 | 8/2006 | Wolf et al. | |
| 2006/0265396 A1 | 11/2006 | Raman et al. | |
| 2006/0288286 A1 | 12/2006 | Chandler et al. | |
| 2007/0050416 A1 | 3/2007 | Battagin et al. | |
| 2007/0136666 A1 | 6/2007 | Khen | |
| 2007/0143663 A1 * | 6/2007 | Hansen | G06F 40/171 715/233 |
| 2007/0162840 A1 | 7/2007 | Rochelle et al. | |
| 2007/0186171 A1 * | 8/2007 | Junuzovic | G06Q 10/10 715/751 |
| 2007/0198952 A1 * | 8/2007 | Pittenger | G06F 40/166 715/781 |
| 2007/0204047 A1 * | 8/2007 | Parker | G06F 3/0488 709/227 |
| 2007/0219956 A1 | 9/2007 | Milton | |
| 2007/0220417 A1 | 9/2007 | Mathew et al. | |
| 2009/0150761 A1 * | 6/2009 | Sawicki | G06F 40/166 715/216 |

(56) References Cited

U.S. PATENT DOCUMENTS

| 2009/0235087 A1 | 9/2009 | Bird |
| 2009/0235154 A1 | 9/2009 | Khen et al. |
| 2013/0007118 A1 | 1/2013 | Rochelle et al. |

FOREIGN PATENT DOCUMENTS

| JP | 2005018791 A | 1/2005 |
| JP | 2005353058 A | 12/2005 |
| JP | 2003003103 | 1/2013 |

OTHER PUBLICATIONS

Enjoy Google Earth & Maps; ASCII, Oct. 2005. (English abstract enclosed.).

Will the Office-Soft be Used Free of Charge on the Web?; PC21, Jan. 2006. (English abstract enclosed.).

The Num Sum FAQ _ Retrieved online: http://web.archive.ora/web/20051125151514/htto://www.nurnsum.com/aboutfaa Oct. 4, 2011.

Jody Gilbert et al. "75 Essential Excel tips", Feb. 2005, TechRepublic, Version 4.0, pp. 1-30.

McLeod, Bob, ""Can I get that as a Spreadsheet?"",http://web.archive.orq/web/20040205171439/http://www.15seconds.com/issue/031007. htm.

C.R. Palmer et al., ""Operation Transforms for a Distributed Shared Spreadsheet"", DatabaseInspec [Online], The Institution of Electrical Engineers, Stevenage, GB, 1998, Abstract only,XP002449782.

C.R. Palmer et al., ""Operation Transforms for a Distributed Shared Spreadsheet"", Proceedings of ACM 1998 Conference on Computer Supported Cooperative Work Nov. 14-18, 1998, Seattle, WA, pp. 69-78, KP002449777.

Mario Sixtus, "Das Netz erfindet sich neu: Ein Streifzug durch das Web 2.0" c't Magazin fur Computer Technik, vol. 2006, No. 5, Feb. 20, 2006, http://www.heise.de/cU06/05/144, 3 pages.

Mario Sixtus, "The network re-invents: A stroll through the Web 2.0" c't Magazin fur Computer Technik, vol. 2006, No. 5, Feb. 20, 2006, machine translation of http://www.heise.de/cU06/05/144, 4 pages.

Mario Sixtus, "Das Netz erfindet sich neu: Ein Streifzug durch das Web 2.0" CT Magazin fur Computer Technik, vol. 2006, No. 5, Feb. 20, 2006, pp. 144-151, XP002449776.

"Stowe, Michael, ""XML Spreadsheet Reference"", MSDN, Aug. 2001,http:JImsdn.microsoft.com/library/en-us/dnexcl2k2/html/odc xmlss.asp?frame=true".

"Stowe, Michael, ""XML in Excel and the Spreadsheet Component"", MSDN, Aug. 2001,http://msdn.microsoft.com/ibrarv/en-us/dnexcl2k2/html/odc xlsmlinss.asp?frame=true".

"Zhang Jianpei et al., ""Multimedia Information Sharing in the Heterogeneous Environment"", Database Inspec [Online], The Institution of Electrical Engineers, Stevenage, GB, 1997, Abstract only, XP002449783.".

"Zhang Jianpei et al., ""Multimedia Information Sharing in the Heterogeneous Environment"", 19971EEE International Conference on Intelligent Processing Systems, Oct. 28-31, 1997, Beijing, China, pp. 1044-1046, XP002449778.".

International Search Report and Written Opinion for corresponding International Application No. PCT/US2007/065608, dated Sep. 20, 2007, 11 pages.

\* cited by examiner

FIG. 5

|   | A | B | C | D | E | F | G | H |
|---|---|---|---|---|---|---|---|---|
| 1 |   |   |   |   | Description |   |   |   |
| 2 | 645 | Expenses for the Trip: |   | $9.00 | food | 640 |   |   |
| 3 |   |   |   | $11.00 | gas |   |   |   |
| 4 |   |   |   | $5.00 | misc. |   |   |   |
| 5 |   |   |   | $25.00 |   |   |   |   |
| 6 |   |   |   |   |   |   |   |   |
| 7 |   |   |   |   |   |   |   |   |
| 8 |   |   |   |   |   |   |   |   |

Cell: E4  $F_x$: misc.   650 — Julie

FIG. 6

COLLABORATIVE ONLINE SPREADSHEET APPLICATION

CROSS-REFERENCE TO RELATED APPLICATION(S)

This application is a continuation application of U.S. application Ser. No. 15/838,535, filed Dec. 12, 2017, which is a continuation application of U.S. application Ser. No. 13/897,964, filed May, 20, 2013, now U.S. Pat. No. 9,852, 120, which is a continuation of U.S. application Ser. No. 13/615,797, filed Sep. 14, 2012, now U.S. Pat. No. 8,447, 886, which is a continuation of U.S. application Ser. No. 11/278,345, filed Mar. 31, 2006, now U.S. Pat. No. 8,307, 119, the disclosures of which are incorporated herein by reference.

BACKGROUND

A. Field of the Disclosure

The present disclosure relates generally to spreadsheet applications, and more specifically, to network-based collaborative spreadsheet applications.

B. Description of the Related Art

Electronic spreadsheet applications are in widespread use in various industries including finance, business and academia. A spreadsheet application is typically used to produce a spreadsheet that is often a rectangular table (or grid) of data and/or programming information. One of the reasons for the popularity of spreadsheet applications is that they can help to facilitate the implementation of analytical and/or database applications. Existing spreadsheet applications tend to be software programs that execute locally on a computer system of a single user. The spreadsheets produced by such a system can be difficult to distribute and difficult to modify or collaborate on when working in a group environment.

SUMMARY

One aspect is a system for providing simultaneous multiuser collaborative access to a spreadsheet. The system includes a server that includes a memory to store instructions and a processor to execute the instructions to transmit the spreadsheet to a first device associated with a first user, transmit the spreadsheet to a second device associated with a second user. The spreadsheet includes a plurality of parts, each part including spreadsheet cells. The first user has a first set of privileges for a first part of the plurality of parts. The second user has a second set of privileges to a second part of the plurality of parts. The first device and the second device concurrently accessing the spreadsheet. The processor further executes instructions to receive, at the server from the first device, a first edit of a first cell of the first part, accept, by the server, the first edit, forward, by the server to the second device, a formatted message that includes the first edit, and provide, by the server to the second device, a real-time visual indication identifying the first user as a last user editing the first part. The real-time visual indication is displayed with the first cell on the second device while the spreadsheet is displayed on the second device.

Another aspect is a method of simultaneous multiuser collaborative access to a spreadsheet. The method includes transmitting, by a server, the spreadsheet to a first device of a first user, and transmitting, by a server, the spreadsheet to a second device of a second user. The first user has a first privilege for a first part of the spreadsheet. The first part includes a first cell. The second user has a second privilege for a second part of the spreadsheet. The method also includes receiving, at the server and while the first device and the second device are concurrently accessing the spreadsheet, a first edit of the first cell from the first device, and a second edit of the second cell from the second device. The method also includes, in response to the first cell and the second cell being a different cell, the first privilege including an edit privilege, and the second privilege including the edit privilege, accepting the first edit, accepting the second edit, forwarding the first edit for display with the first cell at the second device, and providing, to the second device, a real-time visual indication identifying the first user as a last user editing the first part. The real-time visual indication is displayed with the first cell at the second device.

Yet another aspect is a method of editing a spreadsheet at a first user device of a first user. The method includes receiving, from a server device, the spreadsheet, which parts, each part including cells. The first user has a first privilege to a first part of the parts. The method also includes displaying the spreadsheet at the first user device, and receiving, from the server device, a real-time visual indication that includes an indication of a second user as a last user editing the first part and an edit of the first part by the second user. The real-time visual indication is displayed with the first part on the first user device, and the spreadsheet is simultaneously displayed on the first user device and a second device associated with the second user.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a diagram illustrating an exemplary spreadsheet interface that may be presented to a user;

FIG. 6 is a diagram illustrating an another exemplary spreadsheet interface that may be presented to a user;

DETAILED DESCRIPTION

The following detailed description refers to the accompanying drawings. The detailed description does not limit the invention.

Overview

Implementations consistent with the principles of the invention relate to an online spreadsheet application. The online spreadsheet application may provide many or all of the features provided by a standard spreadsheet application. The online spreadsheet application may provide the ability for a number of users, potentially at physically remote locations relative to one another, to easily collaborate and modify a spreadsheet. Additionally, the online spreadsheet application may allow users to easily publish their created spreadsheets.

System Description

Figure 1:
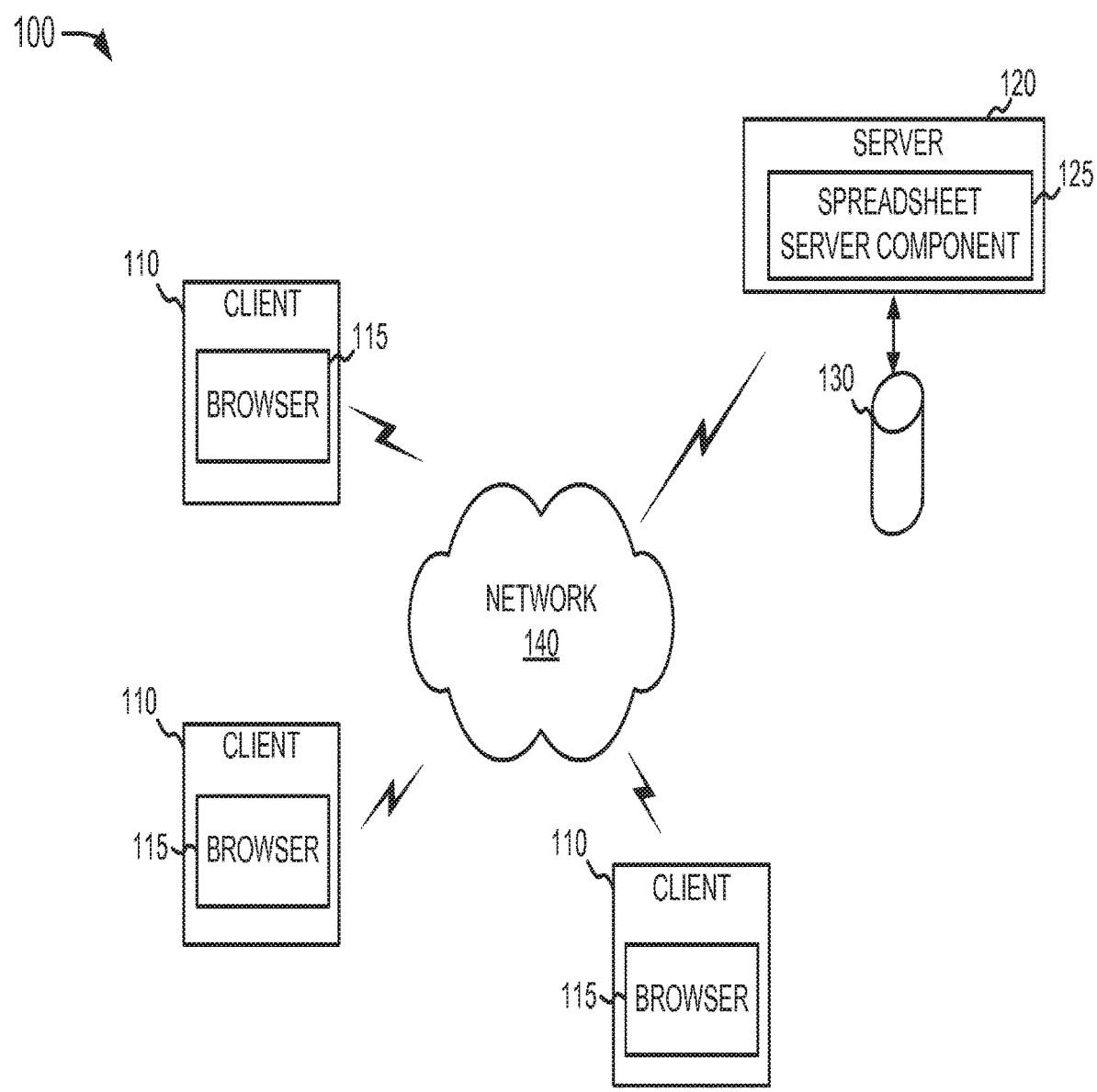
FIG. 1 is a diagram of an exemplary system in which concepts consistent with the principles of the invention may be implemented.

FIG. 1 is a diagram of an exemplary system 100 in which concepts consistent with the principles of the invention may be implemented. System 100 may include multiple clients 110 that can connect to servers, such as server 120, via a network 140. Network 140 may include a local area network (LAN), a wide area network (WAN), a telephone network, such as the Public Switched Telephone Network (PSTN), an intranet, the Internet, or a combination of networks. Three clients 110 and one server 120 are illustrated as connected to network 140 for simplicity. In practice, there may be more clients and/or servers. Also, in some instances, a client may perform one or more functions of a server and a server may perform one or more functions of a client.

A client 110 may include a device, such as a personal computer, a lap top computer, a wireless telephone, a personal digital assistant (PDA), or another type of computation or communication device. Users of clients 110 may access or receive information from server 120.

In the implementation shown, server 120 may generally interact with clients 110 such that clients 110, in conjunction with server 120, execute an online spreadsheet application. Server 120 may include software, labeled as spreadsheet server component 125, to assist implementing the online spreadsheet application. Online spreadsheet applications created by users of clients 110 may be stored by server 120 in, for example, storage media such as database 130. Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented. That is, whether a computing device is operating as a client or a server may depend on the context of the role of the computing device within the application. The relationship of client and server arises by virtue of computer programs running on the respective computers and having a client-server relationship to each other.

The interaction of clients 110 with server 120 may be through browser programs 115 at clients 110. For example, the online spreadsheet application may be a web application that runs within browsers 115. In this manner, clients 110 may not be required to install any spreadsheet specific software to use the online spreadsheet at client 110. Browser programs are well known and are widely available in the art. When browsers or browser programs are discussed herein, these terms are intended to refer to any program that allows a user to browse markup documents (e.g., web documents), regardless of whether the browser program is a stand alone program or an embedded program, such as a browser program included as part of an operating system.

Exemplary Computing Device Architecture

Figure 2:
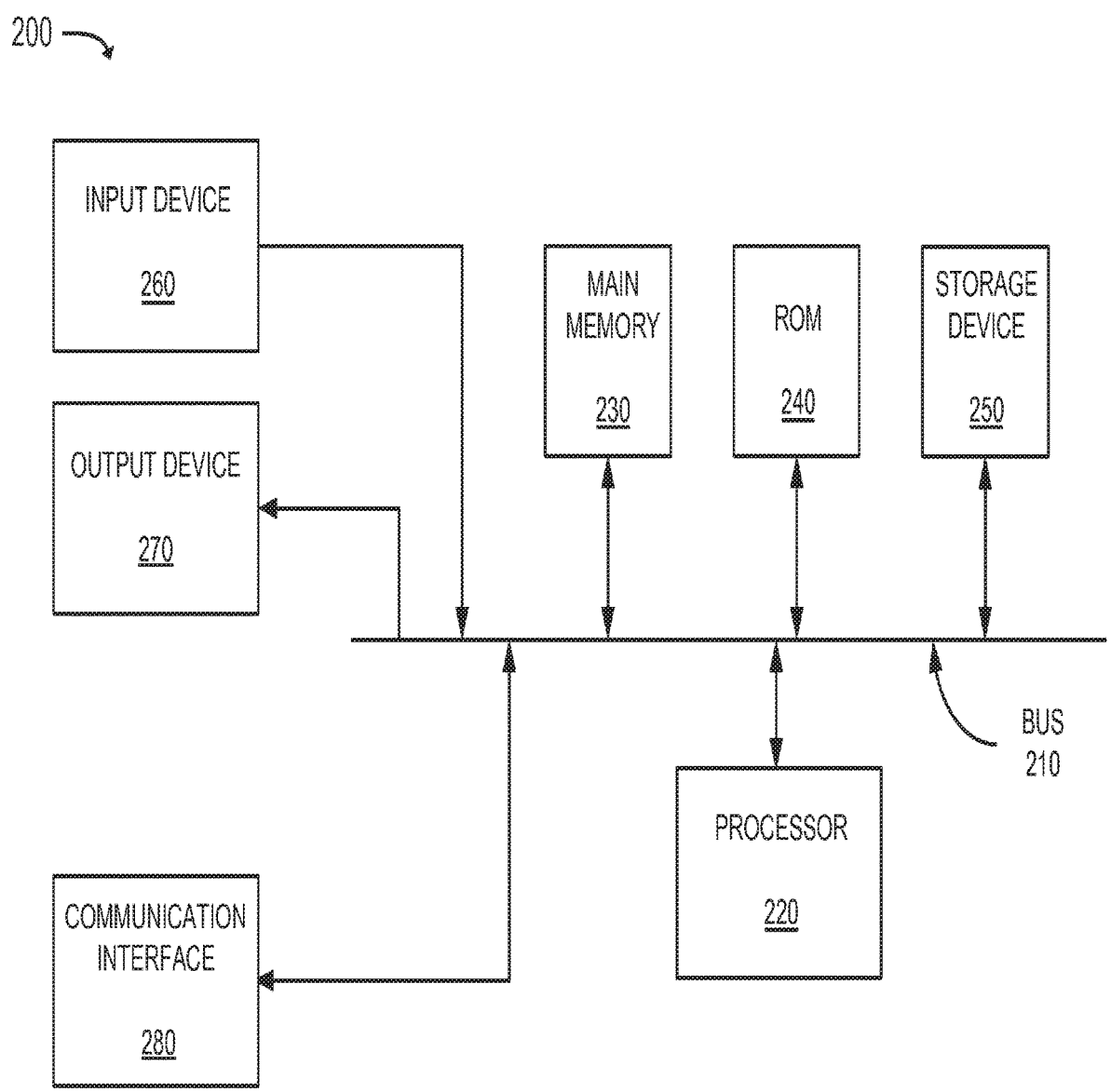
FIG. 2 is an exemplary diagram of a computing device illustrated in FIG. 1.

FIG. 2 is an exemplary diagram of computing device 200, such as one of clients 110 or server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that interprets and executes instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 200, such as a keyboard, a mouse, a pen, voice recognition and/or biometric mechanisms, etc. Output device 270 may include a conventional mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Spreadsheet server component 125 may be implemented in software and stored in a computer-readable medium, such as memory 230. A computer-readable medium may be defined as one or more physical or logical memory devices and/or carrier waves.

The software instructions defining spreadsheet server component 125 may be read into memory 230 from another computer-readable medium, such as data storage device 250, or from another device via communication interface 280. The software instructions contained in memory 230 cause processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Online Spreadsheet Application

An online spreadsheet application, as described herein, may be implemented as a distributed web application in which portions of the application execute at one or more of clients 110 and at server 120. More specifically, clients 110 that wish to use the online spreadsheet application may request the spreadsheet application from server 120. In response, server 120 may transmit portions of the spreadsheet application for local execution at clients 110. The online spreadsheet application may thus execute as a distributed application across server 120 and one or more of clients 110.

Figure 3:
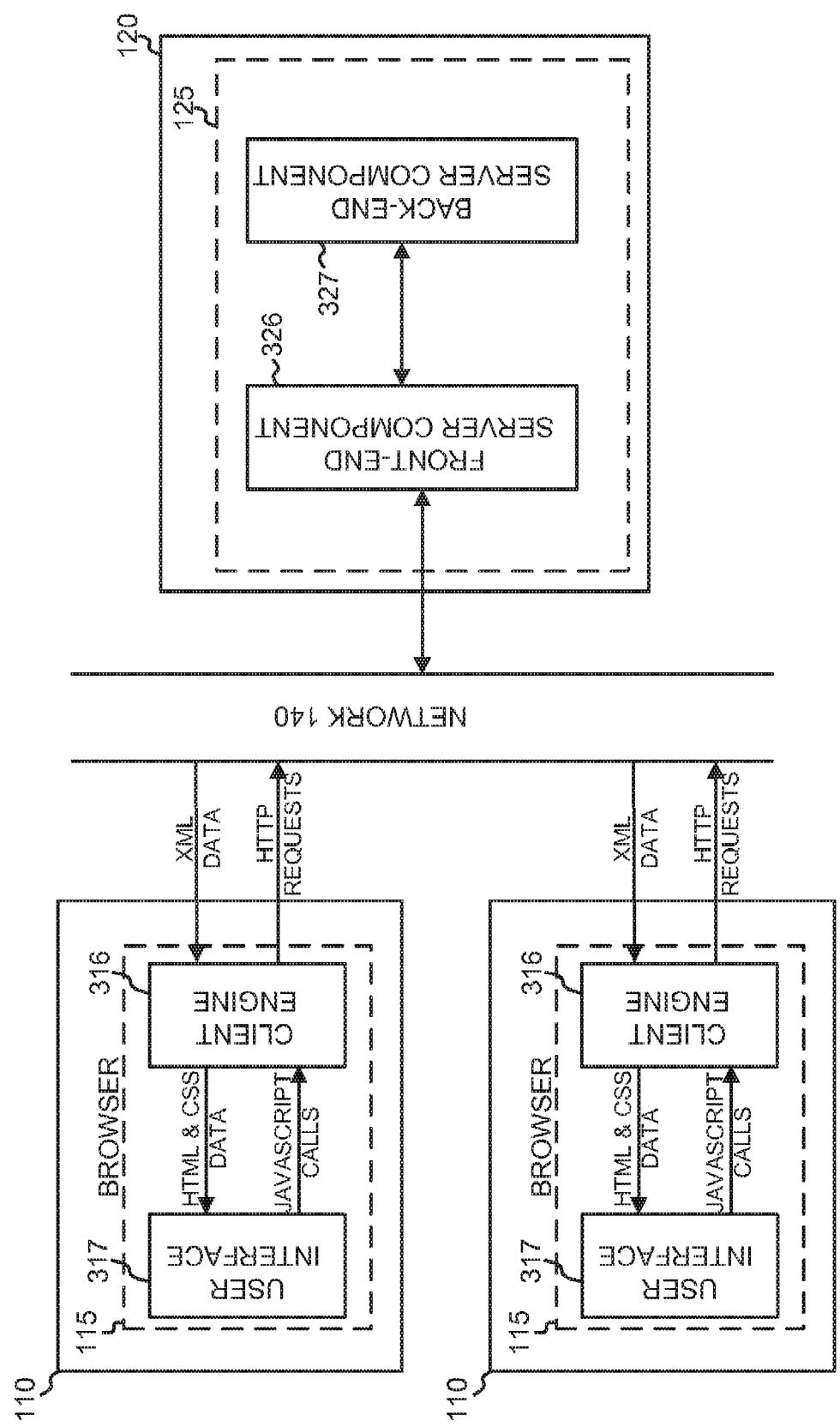
FIG. 3 is a diagram illustrating an exemplary implementation of an online spreadsheet application.

FIG. 3 is a diagram, similar to FIG. 1, and illustrating an exemplary implementation of the online spreadsheet application in additional detail. Spreadsheet server component 125 may include a front-end component 326 and a back-end component 327. Front-end component 326 may include a web and/or XML server that interfaces with clients 110. For example, front-end component 326 may receive HTTP requests from clients 110 and transmit XML data to clients 110. Back-end component 327 may perform the more substantive processing related to the spreadsheet application, such as the calculation of functions required to update a spreadsheet.

Portions of the online spreadsheet application may also execute within clients 110. For example, within browser 115, the online spreadsheet application may be conceptualized as including a client engine 316 and a user interface 317. Client engine 316 may be implemented using, for example, Javascript that is downloaded from server 120 when needed by client 110. User interface 317 may provide the final user interface that is displayed in browser 115 based on, for example, HTML (hyper-text markup language) and CSS (cascading style sheets) data supplied from client engine 316.

User interface 317 and client engine 316 together act to reduce the start-stop start-stop nature of traditional browser-based web applications, as client engine 316 adds a client-side layer that can handle many of the user interactions with user interface 317. Instead of loading a web page at the start of a user session, browser 115 may load client engine 316 from server 120 (or, alternatively, from a local cache). Client engine 316 may be responsible for both rendering the interface the user sees and communicating with server 120 on the user's behalf. Client engine 316 allows the user's interaction with the online spreadsheet application to happen asynchronously, i.e., independent of communication with server 120.

In one implementation, the client-side operation of the online spreadsheet application may be implemented using the known Asynchronous JavaScript And XML (AJAX) web development techniques, although one of ordinary skill in the art will recognize that other technologies could be used.

Figure 4:
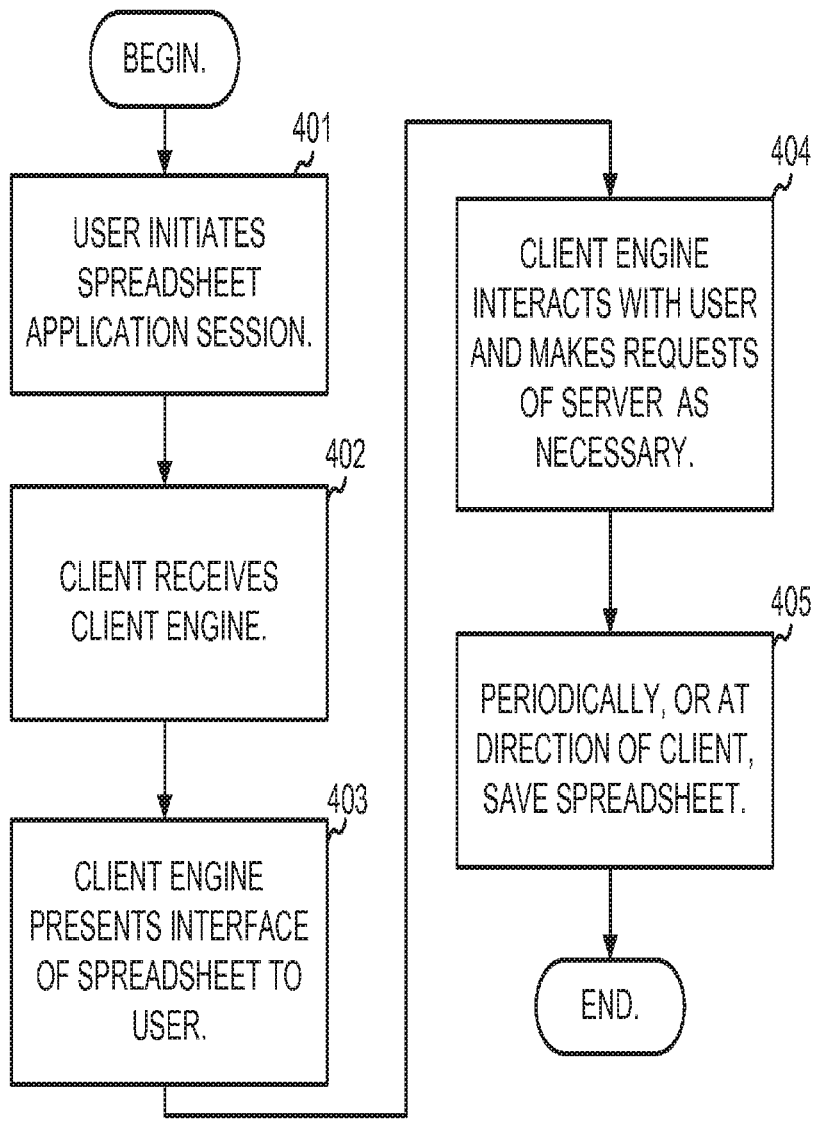
FIG. 4 is a flow chart illustrating exemplary operations of the various components of the online spreadsheet application in an exemplary spreadsheet session.

FIG. 4 is a flow chart illustrating exemplary operations of the various components of the online spreadsheet application in an exemplary spreadsheet session. A user at one of clients 110 may initiate a spreadsheet application session (act 401) For instance, the user of a client 110 may contact front-end component 326 using browser 115. In some implementations, the user may be required to have previously registered or created an account with and be logged into spreadsheet server component 125.

In response to the user initiating a spreadsheet session, spreadsheet server component 125 may transmit client engine 316 to the client 110 (act 402). Some portions of client engine 316 may be cached at client 110 from a previous session, in which case these portions do not need to be re-downloaded from server 120. In some implementations, the programming code that comprises client engine 316 may be implemented in a modular manner. In this situation, portions of client engine 316 may be transmitted to client 110 on an as-demand basis as the functionality of those portions of client engine 316 are needed by client 110. For example, client engine 316 may implement a number of "core" functions, such as basic user interaction and display functions, that are always transmitted to client 110, while other functions, such as more specialized spreadsheet functions, may be transmitted to client 110 on an as-need basis. Additionally, some functions of online spreadsheet application may always be executed by back-end component 327 and may therefore never be transmitted to client engine 316.

Because client engine 316 can be transmitted to client 110 as needed by client 110, the online spreadsheet application may be an entirely web-based application in which the client does not need to pre-install any portion of client engine 316. Advantageously, a user will typically be able to use the online spreadsheet application from any computing device that includes a compatible browser 115 and that is connected to network 140.

Client engine 316, once loaded at client 110, may present, via user interface 317, the graphical user interface of a spreadsheet to the user (act 403). The spreadsheet, also called a spreadsheet document herein, is the data object that the spreadsheet application presents to the user. The spreadsheet presented to a user may be a "blank" spreadsheet from which the user may begin a new spreadsheet document, a spreadsheet document retrieved from a previous session of the online spreadsheet application, or a version of the spreadsheet document imported from a conventional spreadsheet document (e.g., an ".xls" document, a ".cvs" document, or other types of known spreadsheet document formats).

Figure 5:
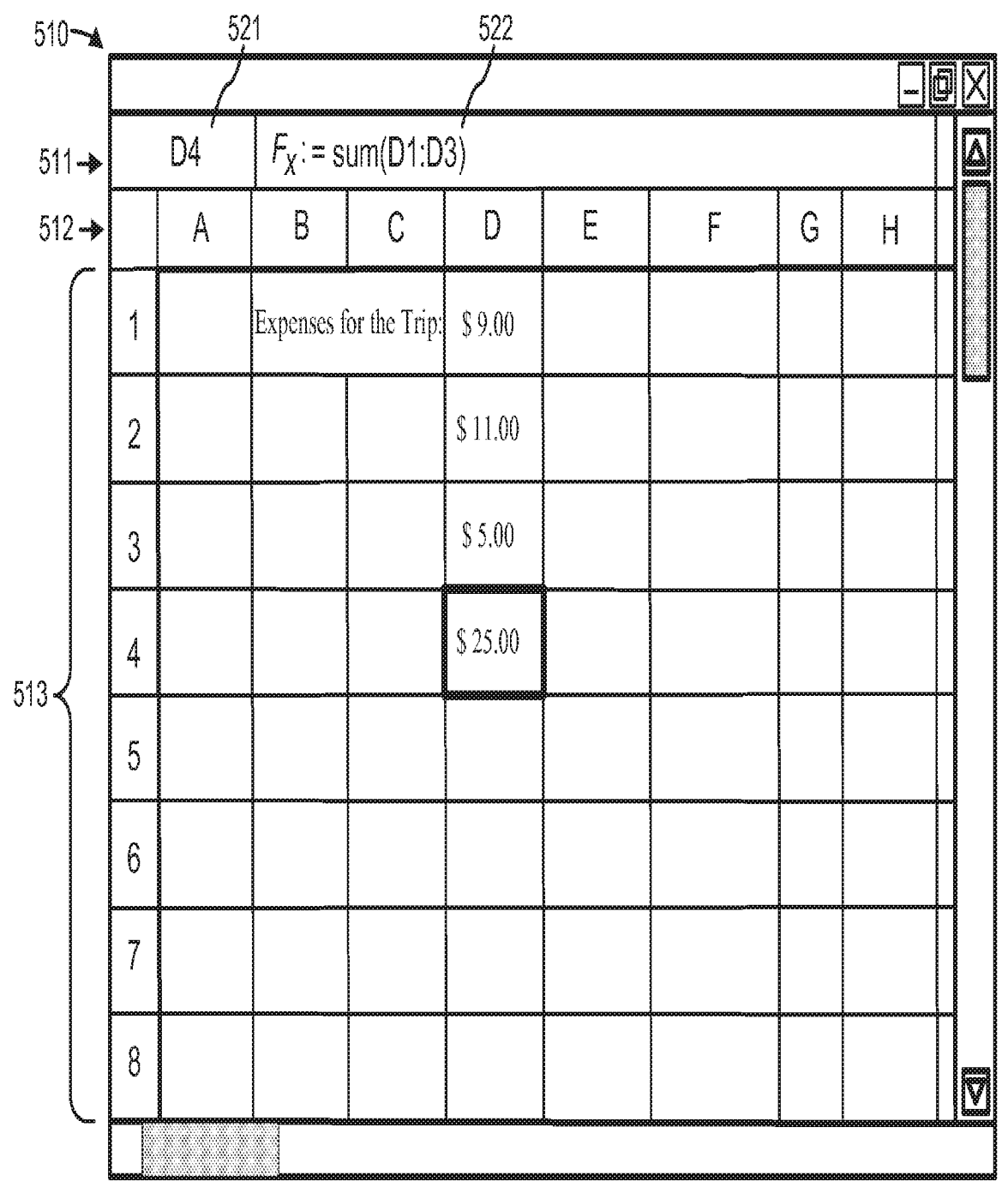

FIG. 5 is a diagram illustrating an exemplary spreadsheet interface that may be presented to a user. A browser may display the spreadsheet interface 510 based on HTML and CSS data received from client engine 316. Spreadsheet interface may include a control row 511, a column heading row 512, and a number of data rows 513 labeled one through eight. Control row 511 may include a field 521 that displays the currently active cell (e.g., cell 04 in the example shown in FIG. 5) and a formula field 522 in which the user may enter formulas or other spreadsheet operations. Column heading row 512 includes the column headings labeled "A" through "H". Users can specify a particular cell in spreadsheet interface 510 by a combination of a column heading and a row heading. Cell 01, for example, includes the value "$9.00".

Through spreadsheet interface 510, a user can, for example, enter values or formulas into the spreadsheet cells and perform formatting operations relating to the spreadsheet. In response, client engine 316 interacts with and makes requests of spreadsheet server component 120 as necessary (act 404). As shown in FIG. 5, a user has entered the text "Expenses for the Trip:" into cell B1 and entered dollar values into cells 01, 02, and 03. Cell 04 is currently the active cell (shown by the bold lines surrounding this cell). The user has entered the formula "=sum(D1:D3)," which is shown in formula field 522, and which directs the spreadsheet to sum the values in cells 01 through 03 and to write the result into cell 04. Further, as is also shown in FIG. 5, the user has modified the width of columns "F" and "G." The user may do this by, for example, dragging the column separation line between columns "F" and "G" in the desired direction.

The above-described functions and operations that are allowable by the online spreadsheet application are exemplary. Through spreadsheet interface 510, the online spreadsheet application may permit a user to perform numerous operations that are generally recognized as being consistent with a spreadsheet application.

In one implementation, client engine 316 may handle most or all of the functionality associated with responding to user actions relating to navigating and/or formatting the spreadsheet interface without needing to contact spreadsheet server component 125. Other functions of the spreadsheet application, such as the evaluation of functions in a spreadsheet, may be handled by logic in back-end component 327. By handling formatting and data entry feedback locally at client 110, the online spreadsheet application can provide a high level of responsiveness to user actions that tend to occur frequently and for which users expect immediate feedback. By handling the evaluation of spreadsheet formulas at back-end component 327, the results of a formula created by a first user can be shared with other users without necessarily sharing the internal details of the formula. In this way, users can share or publish custom formulas/operations while potentially keeping the internal details proprietary.

One of ordinary skill in the art will recognize that in alternate implementations, the division of functions executed at client engine 316 and back-end component 327 may be modified such that client engine 316 handles more or fewer functions and similarly, back-end component 327 may also handle more or fewer functions.

Periodically, or at the explicit direction of the user via spreadsheet interface 510, the data that comprises the spreadsheet document may be saved (act 405). In one possible implementation, the spreadsheet document may be saved by spreadsheet server component 125 to database 130. In this manner, the spreadsheet document may be accessible by the user (or by other users) from any computing device connected to network 140.

Additional Functionality of the Online Spreadsheet Application

Additional functionality provided by the online spreadsheet application will next be described in additional detail.

The online spreadsheet application may provide for collaboration among multiple users working on a single spreadsheet. For example, multiple users may simultaneously edit a spreadsheet and view the edits of each of the users. When one user edits a particular cell of the spreadsheet, the edit may be transmitted to spreadsheet server component 125 and then forwarded to other collaborating users that are also editing or viewing the spreadsheet. To this end, spreadsheet server component 125 may handle conflicts between collaborating users, such as when two users try to simultaneously edit a particular cell. For example, spreadsheet server component 125 may accept the first edit received or in some way prioritize the collaborating users such that the edits of higher priority users override those of lower priority users. If an edit of a user is rejected by spreadsheet server component 125, spreadsheet server component 125 may transmit a message back to the user that informs that user of the rejection of the edit. In this manner, multiple users may collaborate, potentially in real-time (or near real-time), on a single spreadsheet.

In one implementation, the parties that may view and collaborate on a particular spreadsheet application may be specified by an initial creator of the spreadsheet. For example, the initial creator may be given "administrator" privileges that allow the creator to specify the privileges for each of the other possible collaborators. The creator may specify that the other collaborators have privileges to do one or more of the following: edit the spreadsheet, view the spreadsheet only, edit designated parts of the spreadsheet, or add additional users to the list of possible collaborators. For example, certain users may be able to edit certain parts of the spreadsheet, while other designated cells or regions of cells will remain "locked" to those users such that the users can view but not edit the locked cells. In some implementations, a spreadsheet may be designated as a "public" spreadsheet that anyone can view and/or edit.

FIG. 6 is a diagram illustrating an exemplary spreadsheet interface 610 that may be presented to a user. Interface 610 is similar to interface 510, except that four additional entries labeled as entries 640, have been added. Assume that the entries were added by a different collaborating user than the user that added initial entries 645. Entries 640 may have been added simultaneously with the first user adding initial entries 645 or after the first user has added entries 645. Each entry made by a collaborating user may be transmitted from client engine 316 of the collaborating user back to spreadsheet server component 125, and then forwarded to all other online collaborating users. In this manner, users can simultaneously collaborate on a document.

In some implementations, users may be able to configure the presentation of spreadsheet interface 610 to in some manner illustrate which users have made which edits. For example, changes made by different users may be shown in a different font or different color for each user. Alternatively or additionally, when a user mouses over or in some way selects a cell, an indication of the collaborator who last edited the cell may be shown. In the example shown in FIG. 6, entries 640 and 645 are shown in different fonts. Also, a text box 650 is shown in FIG. 6. Text box 650 may be filled with the name of the last user to edit the currently selected cell. In this example, cell E4 is the currently selected cell (shown in bold) and the last person to edit this cell is the user "Julie."

In addition to collaboration between users, the online spreadsheet application may allow collaborators to interactively communicate with one another as they are working on a spreadsheet.

Figure 7:
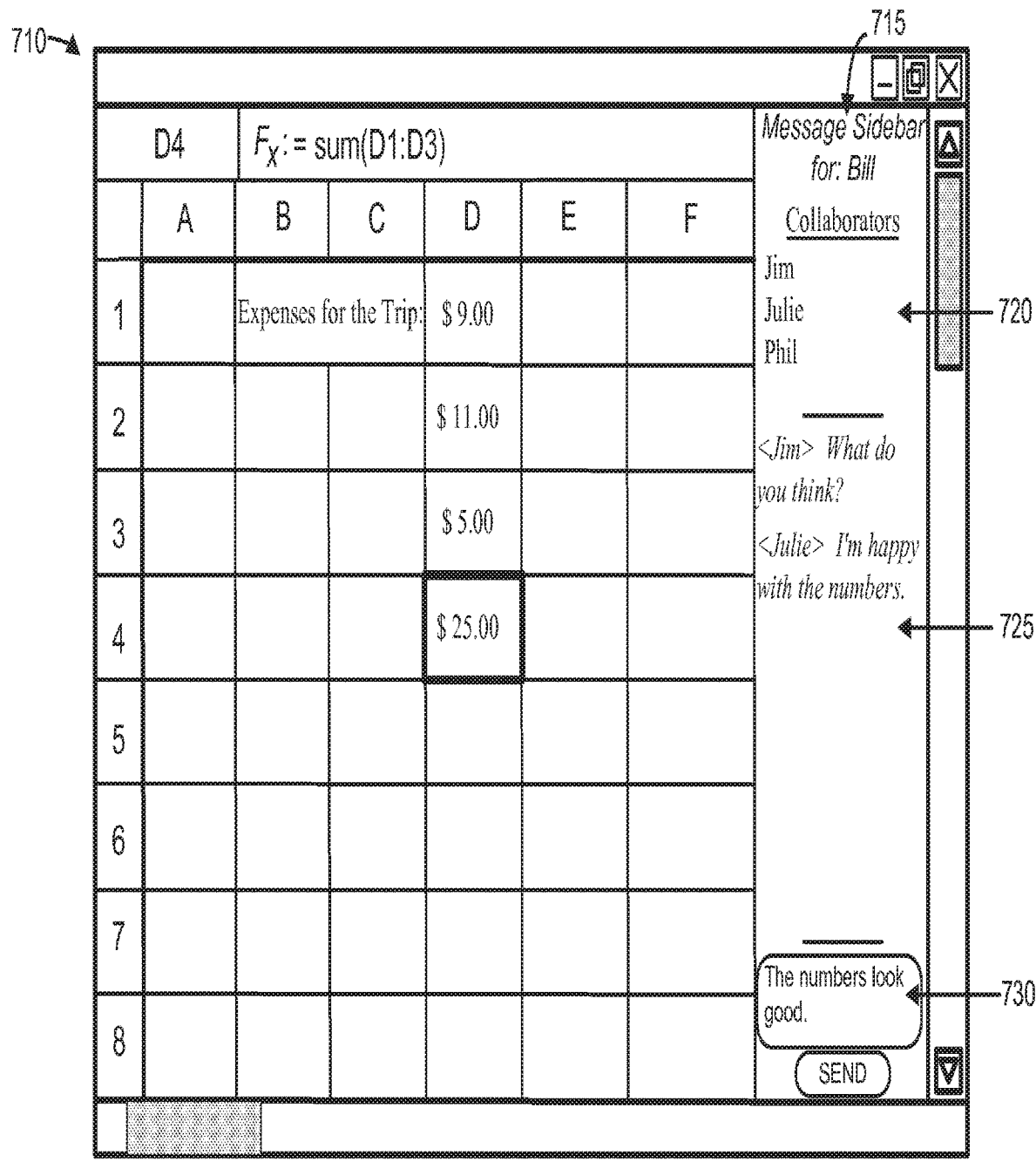
FIG. 7 is a diagram illustrating another exemplary spreadsheet interface that may be presented to a user.

FIG. 7 is a diagram illustrating another exemplary spreadsheet interface 710 that may be presented to a user. Interface 710 is similar to interfaces 510 and 610, except that interface 710 additionally includes a messaging sidebar 715 in which collaborators to the spreadsheet application may communicate with one another.

Sidebar 715 may include an area 720 that shows the users that are currently viewing or editing the spreadsheet. This list of users may correspond to the users that are logged into spreadsheet server component 125 for the particular spreadsheet. Sidebar 715 may also include a message area 725 that displays past messages sent between users, and an input area 730 in which users may enter messages. Messages typed into input area 730 may be displayed in message area 725 to all other users or to a select number of users. A entered message may, for example, be transmitted from client engine 316 of the user sending the message to spreadsheet server component 125. At spreadsheet server component 125, the entered message may be retransmitted back to client engine 316 of all other online collaborators. In this manner, collaborators on a spreadsheet can communicate in real-time with one another while working with the spreadsheet.

One of ordinary skill in the art will recognize that messaging sidebar 715, as described above, is exemplary, and that the actual visual layout and messaging functionality provided by messaging sidebar may vary. For example, messaging sidebar may include a voice link that allows users to initiate voice sessions over network 140 with one another.

In some implementations, the online spreadsheet application may provide an interface through which users can publish their created spreadsheets, either by allowing any user of the online spreadsheet application to open the spreadsheets or by allowing users to embed a created spreadsheet in a web page. Users that wish to publish spreadsheets in web pages may, for example, be provided with a to link spreadsheet server component 125 that also includes an identification of the particular spreadsheet document that the user would like to publish.

Figure 8:
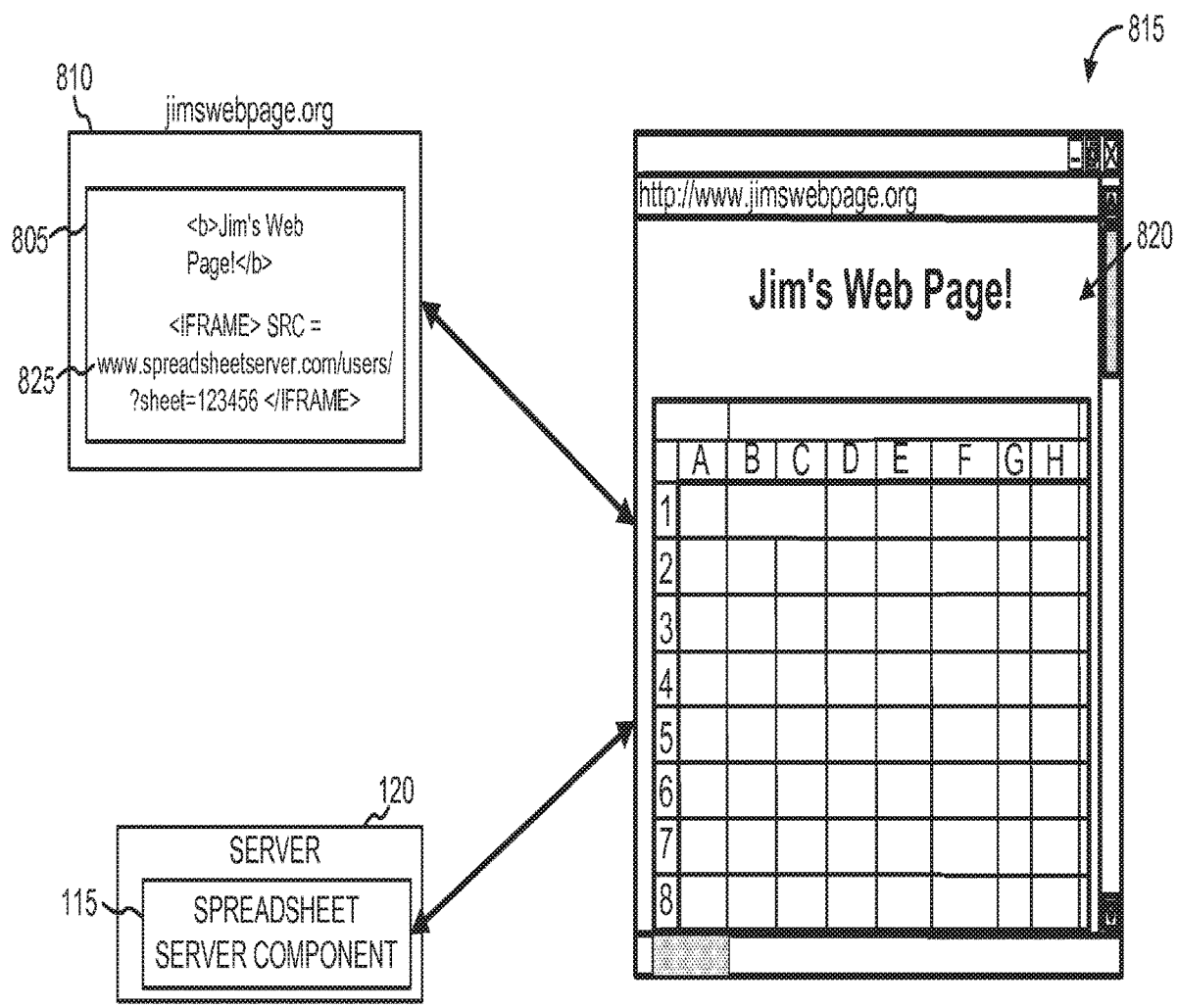
FIG. 8 is a diagram illustrating a spreadsheet embedded within a web page consistent with an aspect of the invention.

FIG. 8 is a diagram illustrating a spreadsheet embedded within a web page consistent with an aspect of the invention. In this example, assume that a user places content 805 on a web server 810 associated with a first domain (e.g., "jimswebpage.org"). A client may visit, using a browser 815, the first domain and receive the content 805 as a web page 820 from web server 810. Content 805 may include within itself a link 825 (such as a link within an HTML inline frame (IFRAME)) to spreadsheet server component 125. One of ordinary skill in the art will recognize that link 825 may be implemented using techniques other than an IFRAME. Link 825 may include a URL that includes an identifier to the particular spreadsheet document that the client is to download from server 120. In the example shown in FIG. 8, spreadsheet server component 125 is associated with the domain "spreadsheetserver.com" and the particular spreadsheet document that is to be downloaded is identified by the string "sheet=123456." When rendering the web page, browser 815 will contact spreadsheet server component 125, download client engine 316, and display the spreadsheet as appropriate at client 812. From the point of view of the user of client 812, the spreadsheet is loaded in response to navigating to the first domain.

The online spreadsheet application may allow users to create custom functions or operations. A custom user function may be created as, for example, a combination of existing functions. The online spreadsheet application may provide more advanced tools, such as the ability to create custom functions in other programming languages, such as custom functions written in JavaScript or custom functions that are compiled as executable code, such as DLL (dynamic link library) files. In one implementation, creators of custom functions may have the ability to publish their custom functions to other users. Spreadsheet server component 125 may facilitate the ability of users to publish their custom functions by providing, for example, an interface through which a user may submit a function and an interface through which other users can search, evaluate, and choose to import other custom functions into their applications. In some implementations, spreadsheet server component 125 may allow users to charge for their custom functions.

Conclusion

A networked spreadsheet application is described herein that executes in a distributed manner over a network. The networked spreadsheet application can generally be used without requiring a user to install any specific spreadsheet software prior to using the application. Further, the networked spreadsheet application, in addition to providing many or all of the features commonly associated with a spreadsheet application, may allow multiple users to easily collaborate on a spreadsheet by providing for the ability for multiple users to edit the spreadsheet and send instant messages to one another while working on spreadsheet.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the computer systems described herein was described as being used to implement an online spreadsheet, they could also be used to create other collaborative documents, such as a wiki or table.

Moreover, while series of acts have been described with regard to FIG. 4, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code- it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system for providing concurrent multiuser collaborative access to a spreadsheet, the system comprising:
    a memory to store instructions; and
    a processing device to execute the instructions to:
        transmit, by a server associated with a spreadsheet server system, the spreadsheet to a first device associated with a first user of a plurality of users of the spreadsheet server system, the spreadsheet comprising a plurality of parts, each part including a set of spreadsheet cells of a plurality of spreadsheet cells of the spreadsheet, and wherein the first user is logged into the spreadsheet server system in view of a user account of the first user with the spreadsheet server system, and has a first set of privileges for a first part of the plurality of parts, the first part including a first set of spreadsheet cells of the plurality of spreadsheet cells of the spreadsheet;
        transmit the spreadsheet to a second device associated with a second user of the plurality of users of the spreadsheet server system, wherein the second user is logged into the spreadsheet server system in view of a user account of the second user with the spreadsheet server system, and has a second set of privileges for a second part of the plurality of parts, the second part including a second set of spreadsheet cells of the plurality of spreadsheet cells of the spreadsheet;
        receive, at the server from the first device, a first edit of the first user for a first spreadsheet cell of the first set of spreadsheet cells, wherein the first device and the second device are concurrently accessing the spreadsheet;
        accept, by the server, the first edit of the first spreadsheet cell;
        forward, by the server to the second device, a message that includes the first edit of the first spreadsheet cell;
        provide, by the server to the second device, a real-time visual indication identifying the first edit of the first spreadsheet cell by the first user that last edited the first spreadsheet cell of the first part, wherein the real-time visual indication causes the edited first spreadsheet cell of the first spreadsheet cell to be displayed on the second device in a first color associated with the first user while the spreadsheet is displayed on the second device; and cause, by the server, additional edits of the second user and one or more other users who are logged into the spreadsheet server system in view of respective user accounts with the spreadsheet server system and are concurrently editing the spreadsheet to be added to corresponding cells of the spreadsheet displayed on the second device, wherein the edited first spreadsheet cell is displayed in the first color and the edited corresponding cells are displayed in the spreadsheet in a plurality of second colors that are each associated with one of the second user and the one or more other users and are different for different users, and wherein a selection of the first color in the edited first spreadsheet cell causes display of an identifier of the first user in the spreadsheet.

2. The system of claim 1, wherein the processing device is to cause the first edit to be presented in the spreadsheet using a user configuration of the second user that specifies at least one of a first font or the first color indicative of an edit by the first user.

3. The system of claim 1, wherein to cause the additional edits of the second user and the one or more other users concurrently editing the spreadsheet to be added to the corresponding cells of the spreadsheet, the processing device is further to:

receive, at the server from the second device, a second edit of a second spreadsheet cell of the second part; and responsive to the second spreadsheet cell being different from the first spreadsheet cell and the second user having an edit privilege to the second spreadsheet cell, accept the second edit.

4. The system of claim 1, wherein the processing device is further to:

receive, at the server from the second device, a second edit of a second cell of the second part; and responsive to the second cell and the first cell being a same cell and the second user having an edit privilege to the second cell, reject the second edit.

5. The system of claim 4, wherein to reject the second edit, the processing device is further to:

transmit a message to the second device informing the second user of the rejecting.

6. The system of claim 1, wherein the processing device is further to:

receive, at the server from the second device and simultaneously with the first edit, a second edit of the first spreadsheet cell of the first part; and reject the second edit in response to determining that the second user has a lower priority than the first user.

7. A method for providing concurrent multiuser collaborative access to a spreadsheet, the method comprising:

transmitting, by a server associated with a spreadsheet server system, the spreadsheet to a first device associated with a first user of a plurality of users of the spreadsheet server system, the spreadsheet comprising a plurality of parts, each part including a set of spreadsheet cells of a plurality of spreadsheet cells of the spreadsheet, and wherein the first user is logged into the spreadsheet server system in view of a user account of the first user with the spreadsheet server system, and has a first set of privileges for a first part of the plurality of parts, the first part including a first set of spreadsheet cells of the plurality of spreadsheet cells of the spreadsheet;

transmitting, by the server, the spreadsheet to a second device associated with a second user of the plurality of users of the spreadsheet server system, wherein the second user is logged into the spreadsheet server system in view of a user account of the second user with the spreadsheet server system, and has a second set of privileges for a second part of the plurality of parts, the second part including a second set of spreadsheet cells of the plurality of spreadsheet cells of the spreadsheet;

receiving, at the server from the first device, a first edit of the first user for a first spreadsheet cell of the first set of spreadsheet cells, wherein the first device and the second device are concurrently accessing the spreadsheet;

accepting, by the server, the first edit of the first spreadsheet cell;

forwarding, by the server to the second device, a message that includes the first edit of the first spreadsheet cell;

providing, by the server to the second device, a real-time visual indication identifying the first edit of the first spreadsheet cell by the first user that last edited the first spreadsheet cell of the first part, wherein the real-time visual indication causes the edited first spreadsheet cell of the first spreadsheet cell to be displayed on the second device in a first color associated with the first user while the spreadsheet is displayed on the second device; and causing, by the server, additional edits of the second user and one or more other users who are logged into the spreadsheet server system in view of respective user accounts with the spreadsheet server system and are concurrently editing the spreadsheet to be added to corresponding cells of the spreadsheet displayed on the second device, wherein the edited first spreadsheet cell is displayed in the first color and the edited corresponding cells are displayed in the spreadsheet in a plurality of second colors that are each associated with one of the second user and the one or more other users and are different for different users, and wherein a selection of the first color in the edited first spreadsheet cell causes display of an identifier of the first user in the spreadsheet.

8. The method of claim 7, further comprising causing the first edit to be presented in the spreadsheet using a user configuration of the second user that specifies at least one of a first font or the first color indicative of an edit by the first user.

9. The method of claim 7, wherein causing the edits of the second user and the one or more other users concurrently editing the spreadsheet to be added to the corresponding cells of the spreadsheet further comprises:

receiving, at the server from the second device, a second edit of a second spreadsheet cell of the second part; and responsive to the second spreadsheet cell being different from the first spreadsheet cell and the second user having an edit privilege to the second spreadsheet cell, accepting the second edit.

10. The method of claim 7, further comprising:

receiving, at the server from the second device, a second edit of a second spreadsheet cell of the second part; and responsive to the second spreadsheet cell and the first spreadsheet cell being a same cell and the second user having an edit privilege to the second spreadsheet cell, rejecting the second edit.

11. The method of claim 10, wherein rejecting the second edit further comprises:
transmitting a message to the second device informing the second user of the rejecting.

12. The method of claim 7, further comprising:
receiving, at the server from the second device and simultaneously with the first edit, a second edit of the first spreadsheet cell of the first part; and
rejecting the second edit in response to determining that the second user has a lower priority than the first user.

13. A non-transitory computer-readable storage medium storing instructions, which when executed by a processing device, cause the processing device to perform operations to provide concurrent multiuser collaborative access to a spreadsheet, the operations comprising:
transmitting, by a server associated with a spreadsheet server system, the spreadsheet to a first device associated with a first user of a plurality of users of the spreadsheet server system, the spreadsheet comprising a plurality of parts, each part including a set of spreadsheet cells of a plurality of spreadsheet cells of the spreadsheet, and wherein the first user is logged into the spreadsheet server system in view of a user account of the first user with the spreadsheet server system, and has a first set of privileges for a first part of the plurality of parts, the first part including a first set of spreadsheet cells of the plurality of spreadsheet cells of the spreadsheet;
transmitting, by the server, the spreadsheet to a second device associated with a second user of the plurality of users of the spreadsheet server system, wherein the second user is logged into the spreadsheet server system in view of a user account of the second user with the spreadsheet server system, and has a second set of privileges for a second part of the plurality of parts, the second part including a second set of spreadsheet cells of the plurality of spreadsheet cells of the spreadsheet;
receiving, at the server from the first device, a first edit of the first user for a first spreadsheet cell of the first set of spreadsheet cells, wherein the first device and the second device are concurrently accessing the spreadsheet;
accepting, by the server, the first edit of the first spreadsheet cell;
forwarding, by the server to the second device, a message that includes the first edit of the first spreadsheet cell;
providing, by the server to the second device, a real-time visual indication identifying the first edit of the first spreadsheet cell by the first user that last edited the first spreadsheet cell of the first part, wherein the real-time visual indication causes the edited first spreadsheet cell edit of the first spreadsheet cell to be displayed on the second device in a first color associated with the first user while the spreadsheet is displayed on the second device; and
causing, by the server, additional edits of the second user and one or more other users who are logged into the spreadsheet server system in view of respective user accounts with the spreadsheet server system and are concurrently editing the spreadsheet to be added to corresponding cells of the spreadsheet displayed on the second device,
wherein the edited first spreadsheet cell is displayed in the first color and the edited corresponding cells are displayed in the spreadsheet in a plurality of second colors that are each associated with one of the second user and the one or more other users and are different for different users, and
wherein a selection of the first color in the edited first spreadsheet cell causes display of an identifier of the first user in the spreadsheet.

14. The non-transitory computer-readable storage medium of claim 13, wherein the operations further comprise causing the first edit to be presented in the spreadsheet using a user configuration of the second user that specifies at least one of a first font or the first color indicative of an edit by the first user.

15. The non-transitory computer-readable storage medium of claim 13, wherein causing the edits of the second user and the one or more other users concurrently editing the spreadsheet to be added to the corresponding cells of the spreadsheet further comprises:
receiving, at the server from the second device, a second edit of a second spreadsheet cell of the second part; and
responsive to the second spreadsheet cell being different from the first spreadsheet cell and the second user having an edit privilege to the second spreadsheet cell, accepting the second edit.

16. The non-transitory computer-readable storage medium of claim 13, wherein the operations further comprise:
receiving, at the server from the second device, a second edit of a second spreadsheet cell of the second part; and
responsive to the second spreadsheet cell and the first cell being a same cell and the second user having an edit privilege to the second spreadsheet cell, rejecting the second edit.

17. The non-transitory computer-readable storage medium of claim 16, wherein rejecting the second edit further comprises:
transmitting a message to the second device informing the second user of the rejecting.

18. The non-transitory computer-readable storage medium of claim 13, wherein the operations further comprise:
receiving, at the server from the second device and simultaneously with the first edit, a second edit of the first spreadsheet cell of the first part; and
rejecting the second edit in response to determining that the second user has a lower priority than the first user.

* * * * *